(12) United States Patent
Fischer et al.

(10) Patent No.: US 7,496,758 B2
(45) Date of Patent: Feb. 24, 2009

(54) METHOD AND APPARATUS FOR PROTECTING AN EXPONENTIATION CALCULATION BY MEANS OF THE CHINESE REMAINDER THEOREM (CRT)

(75) Inventors: Wieland Fischer, Munich (DE); Jean-Pierre Seifert, Munich (DE)

(73) Assignee: Infineon Technologies AG, Neubiberg (DE)

( * ) Notice: Subject to any disclaimer, the term of this patent is extended or adjusted under 35 U.S.C. 154(b) by 852 days.

(21) Appl. No.: 10/825,625

(22) Filed: Apr. 15, 2004

(65) Prior Publication Data

US 2004/0260931 A1    Dec. 23, 2004

Related U.S. Application Data

(63) Continuation of application No. PCT/EP02/11530, filed on Oct. 15, 2002.

(30) Foreign Application Priority Data

Oct. 17, 2001 (DE) .................. 101 51 139
Dec. 19, 2001 (DE) .................. 101 62 584

(51) Int. Cl.
*H04L 9/00* (2006.01)
(52) U.S. Cl. ............... 713/176; 380/277; 726/2
(58) Field of Classification Search ........... 380/277; 726/2
See application file for complete search history.

(56) References Cited

U.S. PATENT DOCUMENTS

| 5,631,960 | A | | 5/1997 | Likens et al. |
| 5,991,415 | A | * | 11/1999 | Shamir ............ 380/30 |
| 6,092,229 | A | | 7/2000 | Boyle et al. |
| 6,144,740 | A | | 11/2000 | Laih et al. |
| 6,282,290 | B1 | | 8/2001 | Powell et al. |
| 6,965,673 | B1 | * | 11/2005 | Boneh et al. ............ 380/28 |
| 6,986,050 | B2 | | 1/2006 | Hypponen et al. |

FOREIGN PATENT DOCUMENTS

| DE | 42 34 165 C1 | 3/1994 |
| DE | 197 25 167 A1 | 12/1998 |
| DE | 199 44 991 A1 | 4/2001 |
| DE | 199 61 838 A1 | 7/2001 |
| DE | 100 24 325 A1 | 12/2001 |
| EP | 0 743 774 A2 | 11/1996 |

(Continued)

OTHER PUBLICATIONS

Wu, Chung-Hsien, et al., "RSA Cryptosystem Design Based on the Chinese Remainder Theorem", IEEE, 2001, pp. 391-395.

(Continued)

*Primary Examiner*—Brandon S Hoffman
*Assistant Examiner*—Chinwendu C Okoronkwo
(74) *Attorney, Agent, or Firm*—Dickstein, Shapiro, LLP.

(57) ABSTRACT

In a method for protecting an exponentiation calculation by means of the Chinese remainder theorem, in particular the combining step (16), wherein the Garner combination algorithm is preferably used, is verified for its correctness prior to outputting (24) the results of the combining step (18). In doing so, the combination algorithm is verified directly prior to outputting the result of the exponentiation calculation, so as to eliminate the outputs of an incorrect result, for example due to a hardware error attack, so as to ward off the error attack.

10 Claims, 3 Drawing Sheets

FOREIGN PATENT DOCUMENTS

| | | |
|---|---|---|
| EP | 0 872 795 A1 | 10/1998 |
| EP | 0 621 569 B1 | 7/1999 |

OTHER PUBLICATIONS

Comba, P.G., "Exponentiation cryptosystems on the IBM PC", IBM Systems Journal, 1990, vol. 29, No. 4, pp. 526-538.

Shand, M., et al., "Fast Implementations of RSA Cryptography", 11th Symposium on Computer Arithmetic, Jun. 29-Jul. 2, 1993, pp. 252-259.

Grossshadl, Johann, "High-Speed RSA Hardware Based on Barret's Modular Reduction Method", 2000, pp. 191-203.

Quisquater, J., et al., "Fast Decipherment Algorithm For RSA Public-Key Cryptosystem", Electronics Letters, Oct. 1982, vol. 18, No. 21, pp. 905-907.

Bao, F., et al., "Breaking Public Key Cryptosystems on Tamper Resistant Devices in the Presence of Transient Faults", Proceedings of the 5th Workshop on Secure Protocols, LNCS 1361, Apr. 7-9, 1997, pp. 115-124.

Klima, Vlastimil, et al., "Attack on Private Signature Keys of the OpenPGP format, PGP TM programs and other applications compatible with OpenPGP", Mar. 22, 2001, pp. 1-20.

Rankl, Wolfgang, et al., "Handbuck der Chipkarten", pp. 138-139.

Boneh, Dan, et al., "On the Importance of Eliminating Errors in Cryptographic Computations", Journal of Cryptology, 2001, vol. 14, pp. 101-119.

Shamir, A., "How to check modular exponentiation", Oral publication.

Bong D et al: "Optimized Software Implementations of the Modular Exponentiation on General Purpose Microprocessors"; Computers & Security, International Journal Devoted to the Study of Technical and Financial Aspects of Computer Security, Elsevier Science Publishers, Amsterdam, NL, vol. 8, No. 7, Nov. 1, 1989, pp. 621-630.

Boneh D et al: "On the Importance of Checking Cryptoghraphic Protocols For Faults"; Advances in Cryptology, Eurocrypt, May 11, 1997, pp. 37-51.

Schindler W: "A Timing Attack Against RSA With the Chinese Remainder Theorem"; Cryptographic Hardware and Embedded Systems, 2nd International Workshop, CHES 2000, Worchester, MA, Aug. 17-18, 2000 Proceedings, Lecture Notes in Computer Science, Berlin: Springer, Germany, pp. 109-124.

Grossschadl J: "The Chinese Remainder Theorem and Its Application in a High-Speed RSA Crypto Chip"; Computer Security Applications, 2000. ACSAC '00, 16th Annual Conference, New Orleans, LA, Dec. 11-15, 2000, Los Alamitos, CA, IEEE Comput. Soc, Dec. 11, 2000, pp. 384-393.

Schnorr C: "Efficient Identification and Signatures for Smart Cards"; Lecture Notes in Computer Science, vol. 434, Berlin, Springer, 1990, pp. 239-252.

Boneh D et al.:"On the Importance of Checking Cryptographic Protocols for Faults"; Lecture Notes in Computer Science, vol. 1233, Berlin, Springer, 1997, pp. 37-51.

Menezes A.J.: "Handbook of Applied Cryptography"; Boca Raton, FL. CRC Press, 1997, pp. 612-613.

Menezes A.J. et al; "RSA public-key encryption"; Handbook of Applied Cryptography; CRC Press 1996, Chapter 8.2.

Rankl et al., "Handbuch der Chipkarten", vol. 3, Hanser Verlag, pp. 506-509 (w/English translation of relevant portion).

* cited by examiner

US 7,496,758 B2

METHOD AND APPARATUS FOR PROTECTING AN EXPONENTIATION CALCULATION BY MEANS OF THE CHINESE REMAINDER THEOREM (CRT)

CROSS-REFERENCE TO RELATED APPLICATIONS

This application is a continuation of co-pending International Application No. PCT/EP02/11530, filed Oct. 15, 2002, which designated the United States and was not published in English.

BACKGROUND OF THE INVENTION

1. Field of the Invention

The present invention relates to cryptography and, in particular, to a method and an apparatus for protecting an exponentiation calculation from error attacks by means of the Chinese remainder theorem (CRT).

2. Description of the Related Art

Modular exponentiation is one of the core calculations for various cryptographic algorithms. One example of a widespread cryptographic algorithm is the RSA cryptosystem described, for example, in "Handbook of Applied Cryptography", Menezes, van Oorschot, Vanstone, CRC Press, 1996, chapter 8.2. The RSA cryptosystem operates as follows. In the encryption, a party B encrypts a message m for another party A. Party A is supposed to decrypt the encrypted message received from B. Initially party B receives the public key from party A. Then party B represents the message to be encrypted as an integer m. Then party B encrypts the message m as follows:

$$c = m^e \bmod n \quad (1)$$

In the equation (1), m represents the plain-text message. e is the public key. n is the module and is also public. c represents the encrypted message.

Party B now sends the encrypted message c to party A.

For decryption, i.e. to recover the plain-text m from the secret text c, A performs the following calculation:

$$m = c^d \bmod n \quad (2)$$

In the equation (2), d represents the private key of party A which is to be protected against attacks.

An RSA signature algorithm is also known in the art. This involves the following procedure. Each entity A initially creates two large prime numbers p and q and then calculates the module n from the product of p and q. As has also been described in chapter 11.3 in the above-mentioned specialist book, a key is generated therefrom, so that each party has a public key comprised of n, i.e. the module, and e, whereas each party additionally has a private key d.

For RSA signature generation and verification, entity A signs a message m. Each entity B is to be able to verify A's signature and to retrieve the message m from the signature.

In the signature generation, entity A initially calculates an integer m'=R(m). Thereafter, entity A conducts the following calculation:

$$s = m'^d \bmod n \quad (3)$$

wherein s is A's signature for the message m.

To verify the party A's signature and for retrieving the message m, party B must proceed as follows:

First of all, party B must obtain the public key (n, e) from A. Then party B conducts the following calculation:

$$m' = s^e \bmod n \quad (4)$$

In the equation (4) e is A's public key.

Party B will then verify whether m' is the element from a space $M_R$. If this is not the case, the signature will be rejected. If this is the case, the message m will be retrieved by calculating $m = R^{-1}(m')$.

It becomes evident from the above representation that modular exponentiation is required in a variety of places. In particular for RSA encryption in equation (2) and for RSA signature generation in equation (3), the secret key d is used for calculation.

Since the secret key—just like the public key—may take on considerable lengths, such as 1024 or 2048 bits, in typical RSA systems, modular exponentiation is a relatively extensive calculation.

To be able to calculate modular exponentiation more rapidly, it is known to employ the so-called Chinese remainder theorem (CRT) described in paragraph 2.120 of the above-designated specialist book. For RSA systems the Garner algorithm, which is also described in the above-described specialist book, chapter 14.5.2, is especially preferred. The classic algorithm for the CRT typically requires a modular reduction with the module M, while this is not the case with the Garner algorithm. Instead, a "large" modular exponentiation is divided into two "small" modular exponentiations in the latter algorithm, the results of which are then united in accordance with the Chinese remainder theorem. Even though two exponentiations are required here, it is still better to calculate two "small" modular exponentiations than one "large" modular exponentiation.

For representing the RSA-CRT method using the Garner algorithm, reference is made to FIG. 3. In a block 100 the input parameters are set forth which all depend only on p and q as well as on key d, but not on the message m to be signed, for example. In a block 102, the output of the algorithm is represented as has been represented by means of equation (2) or equation (3).

A first modular auxiliary exponentiation (sp) is then calculated, in a block 104, from the input quantitys represented in block 100. By analogy therewith, a second modular auxiliary exponentiation (sq) is calculated in a block 106. The results of the first and second modular auxiliary exponentiations are then joined in accordance with the Chinese remainder theorem in a block 108 to obtain the result $s = m^d \bmod n$. Generally, the RSA-CRT method represented in FIG. 3 is about four times faster than direct calculation of the output represented in block 102, for example by means of the square-and-multiply algorithm.

Due to the efficiency of calculation, the RSA-CRT algorithm represented in FIG. 3 is in any case preferable to the square-and-multiply algorithm. However, the RSA-CRT algorithm has the disadvantage that it is very susceptible to cryptographic "attacks" in that the secret key d may be determined if an erroneous calculation of the RSA-CRT algorithm is evaluated accordingly. This fact has been described in "On the Importance of Eliminating Errors in Cryptographic Computations", Boneh, De-Millo, Lipton, J. Cryptology (2001) 14, pp. 101 to 119. The document elaborates on the fact that in one implementation of the RSA method based on the Chinese remainder theorem (CRT), the secret signature key may be determined from a single erroneous RSA signature.

An erroneous RSA signature may be obtained by causing the software or hardware executing the algorithm to make errors, for example by exposing the crypto-processor to an mechanical or thermal load.

As countermeasures against such attacks based on hardware errors it has been proposed to verify the output of each calculation before same is output from the chip. Even though this additional verification step may downgrade the system behavior, mention is made that this additional verification is essential for security reasons.

The simplest manner of verification is to perform a counter-calculation with the public exponent e, the intention being to determine the following identity:

$$(m^d)^e = m \bmod n \tag{5}$$

However, this additional verification step is directly comparable to the actual signature and/or decryption step in terms of computing expenditure and therefore leads to a pronounced decrease in the system behavior, but provides a large amount of security.

However, another advantage is that the public key e is not available in common protocols, such as ZKA-lib, for example. ZKA-lip is a collection of specifications of the central credit committee governing which data is available. For the RSA-CRT method, only the input data given in block 100 of FIG. 3 is available. Here, the public key e is not part of the parameters preset in the ZKA-lib description. The exponent e would therefore have to be calculated with a lot of expenditure so as to be able to perform the "counter-calculation" in accordance with equation (5). This would further reduce the performance of the signature chip card and is likely to lead to the effect that such algorithms stand no chance of catching on in the market due to their slow mode of operation.

A further method for verifying signatures created by RSA-CRT methods is described in the specialist publication by A. Shamir, "How to check modular Exponentiation", Rump Session, Eurocrypt 97. This specialist publication suggests using a small random number r (for example, 32 bits) and to perform the following calculation instead of the calculation in block 104:

$$sp' = m^d \bmod pr \tag{6}$$

The following calculation is performed instead of block 106:

$$sp' = m^d \bmod qr \tag{7}$$

Subsequently, immediately after the calculations in accordance with the equations (6) and (7), the following verification calculations are performed:

$$sp' \bmod r = sq' \bmod r \tag{8}$$

If the verification in accordance with equation (8) is true, sp and sq are obtained from the following equation (9):

$$sp' \bmod p = sp; \; sq' \bmod q = sq \tag{9}$$

From the values sp and sq obtained through equation (9), the calculation represented in block 108 in FIG. 3 is then performed so as to put combine the total result s by means of the Chinese remainder theorem from the modular auxiliary exponentiations.

This method has the disadvantage that only the auxiliary parameter r and the intermediate results sp' and sq' are used for verification, the verification not leading to the suppression of an output value if a cryptographic attack has taken place which possibly has not affected the intermediate results sp', sq' or the parameter r, but subsequently leading to a hardware error, for example in the steps given in equation (9) and in the final combining of the algorithm, which hardware error may be used to spy out the secret key d without permission.

In addition, the cited specialist publication by Boneh et al. proposes, for example as a countermeasure for protecting the Fiat-Shamir scheme, warding off any occurring register errors, while the processor is waiting for an external response, by employing error detection bits for protecting the internal memory of a processor. Further measures to protect RSA signatures are to introduce a randomness into the signature method. The randomness ensures that the signer never signs the same message twice. In addition, if the verifier is presented with an erroneous signature, it does not know the complete plain-text that has been signed.

SUMMARY OF THE INVENTION

It is the object of the present invention to provide an improved concept for protecting an exponentiation calculation from error attacks by means of the Chinese remainder theorem (CRT).

In accordance with a first aspect, the present invention provides a method for protecting an exponentiation calculation by means of the Chinese remainder theorem (CRT) using two prime numbers forming auxiliary modules for calculating auxiliary quantities which may be joined to calculate a modular exponentiation for a module equal to the product of the auxiliary quantities, wherein the exponentiation calculation is performed within a cryptographic algorithm for an encryption of a message, a decryption of a message, a signature generation from a message or a signature verification calculation from a message, including calculating the first auxiliary quantity using the first prime number as the module and using the message; calculating the second auxiliary quantity using the second prime number as the module and using the message; combining the first auxiliary quantity and the second auxiliary quantity using a combination algorithm to obtain a result of the exponentiation calculation; following the combining step, verifying the result of the exponentiation calculation by means of a verifying algorithm, which differs from the combination algorithm, using the first prime number and/or the second prime number, the verifying algorithm providing a predetermined result if the combining step has been performed correctly; and if the verifying step shows that the verifying algorithm provides a result other than the predetermined result, suppressing an output of the result of the exponentiation calculation.

In accordance with a second aspect, the present invention provides an apparatus for protecting an exponentiation calculation by means of the Chinese remainder theorem using two prime numbers forming auxiliary modules for a calculation of auxiliary quantities which may be joined to calculate a modular exponentiation for a module which is equal to the product of the auxiliary quantities, wherein the exponentiation calculation is performed within a cryptographic algorithm for an encryption of a message, a decryption of a message, a signature generation from a message or a signature verification calculation from a message, the apparatus having means for calculating the first auxiliary quantity using the first prime number as the module and using the message; means for calculating the second auxiliary quantity using the second prime number as the module and using the message; means for combining the first auxiliary quantity and the second auxiliary quantity using a combination algorithm to obtain a result of the exponentiation calculation; means for verifying the result of the exponentiation calculation by means of a verifying algorithm, which differs from the combination algorithm, using the first prime number and/or the second prime number, the verifying algorithm providing a predetermined result if the means for combining has provided a correct result; and means for suppressing an output of the result of the exponentiation calculation if the means for verifying indicates that the verifying algorithm provides a result other than the predetermined result.

The present invention is based on the findings that there is a security leak when the combining of two auxiliary quantities, which are modular exponentiations with a "small" module, by means of the Chinese remainder theorem so as to obtain the result of a modular exponentiation with a "large" module, is not verified. If only the calculation of the auxiliary quantities is verified, but no verification is performed subsequently, in the combining step, an error attack which does not results in a malfunction of the computational unit in the cryptography processor until after the calculation of the auxiliary quantities may lead to an incorrect output. For reasons of efficiency, RSA calculations by means of the Chinese remainder theorem are particularly desirable since they allow a gain in calculating time by a factor of 4. On the other hand, RSA calculations with CRT are particularly susceptible to security leaks. After all, verification of the combining step is not supposed to be particularly expensive so as not to cancel the gain in calculating time achieved by using the CRT by the renewed calculation of the combining step. After combining the first auxiliary quantity and the second auxiliary quantity, the result of the exponentiation calculation is verified, in accordance with the invention and with the aim of obtaining a result of the exponentiation calculation, by means of a verifying algorithm which differs from the combination algorithm and accesses a first prime number and/or a second prime number. If the verification proves that the verifying algorithm provides a result other than the predetermined result, the output of the result of the exponentiation calculation is suppressed. Otherwise it may be assumed that no hardware attack has taken place, so that the result of the exponentiation calculation may be output.

One advantage of the present invention is that the security leak that has hitherto existed in the act of combining by means of the Chinese remainder theorem is mended.

A further advantage of the present invention is that no renewed combination calculation must take place for verification, but that a verification of the exponentiation calculation may be performed with simple means using the first and/or the second prime numbers.

A further advantage of the present invention is that now a security verification is no longer performed somewhere in the middle of the RSA-CRT algorithm but directly before outputting the result relevant for an attacker.

A further advantage of the present invention is that the verification of the combining step may readily be combined, in accordance with the present invention, with further verification measures, for example for verifying the results of the auxiliary exponentiations or for warding off any hardware attacks by verifying the input data after the cryptographic calculation, so as to obtain an RSA-CRT algorithm which is protected towards all sides and in which the additional expense for protecting the algorithm from hardware attacks is small compared to the gain achieved by using the RSA-CRT method.

BRIEF DESCRIPTION OF THE DRAWINGS

These and other objects and features of the present invention will become clear from the following description taken in conjunction with the accompanying drawings, in which.

DESCRIPTION OF THE PREFERRED EMBODIMENTS

Figure 1:
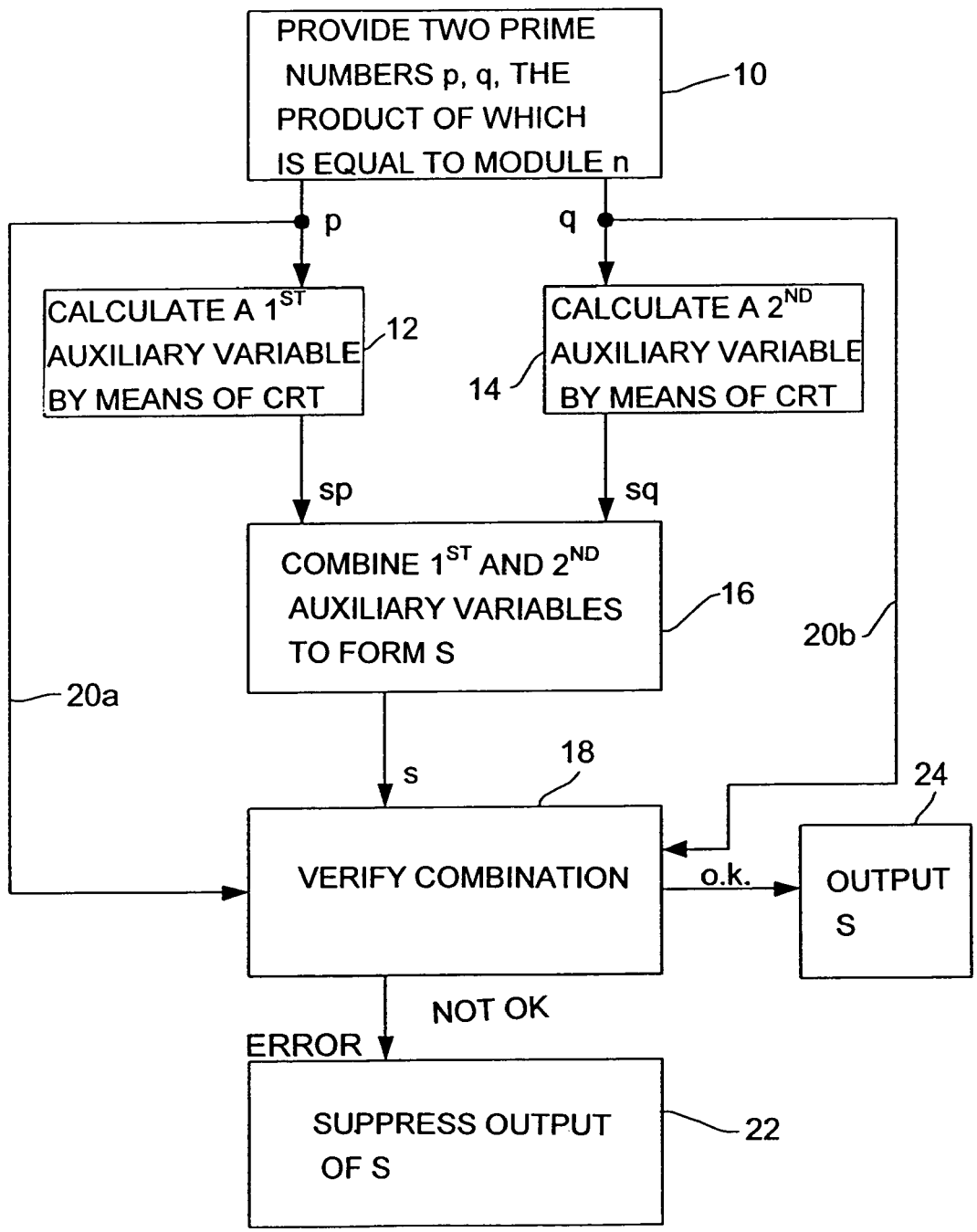
FIG. 1 shows a block diagram of the inventive concept.

FIG. 1 shows a block diagram of the inventive concept for protecting an exponentiation calculation by means of the Chinese remainder theorem. Initially, two prime numbers p, q are provided, the product of which equals module n (block 10). Subsequently, a first auxiliary quantity sp is calculated using the first prime number p and using the Chinese remainder theorem (block 12). By analogy therewith, a second auxiliary quantity sq is calculated using the second prime number q and also using the CRT. The first and second auxiliary quantities sp, sq are now combined (block 16) so as to obtain an exponentiation with a "large" module n from the two auxiliary exponentiations sp and sq each having a "small" module p and q, respectively. The best gain is achieved if both prime numbers p, q have about the same length, i.e. are each half the size as the "large" module n.

In accordance with the invention, the combination of the first and the second auxiliary quantities is verified in a block 18 by means of a verification algorithm, which differs from the combination algorithm executed in block 16 and uses the result s of the combination and the first prime number and/or the second prime number, as is represented symbolically by prime number input lines 20a, 20b. If the verification in block 18 proves that the verifying algorithm used in block 18 provides a result other than the predetermined result, the process jumps to a block 22 which suppresses an output of the result of the combining step 16. If the verification algorithm in block 18 proves, however, that the predetermined result is yielded, the process may jump to a block 24 so as to cause the result of the combining step 16 to be output. This output may be, for example, a digital signature or a decrypted plain text.

In a preferred embodiment of the present invention, the verification algorithm is as follows:

$$s \bmod p = sp \text{ and/or} \tag{10}$$

$$s \bmod p = sq \tag{11}$$

Figure 3:
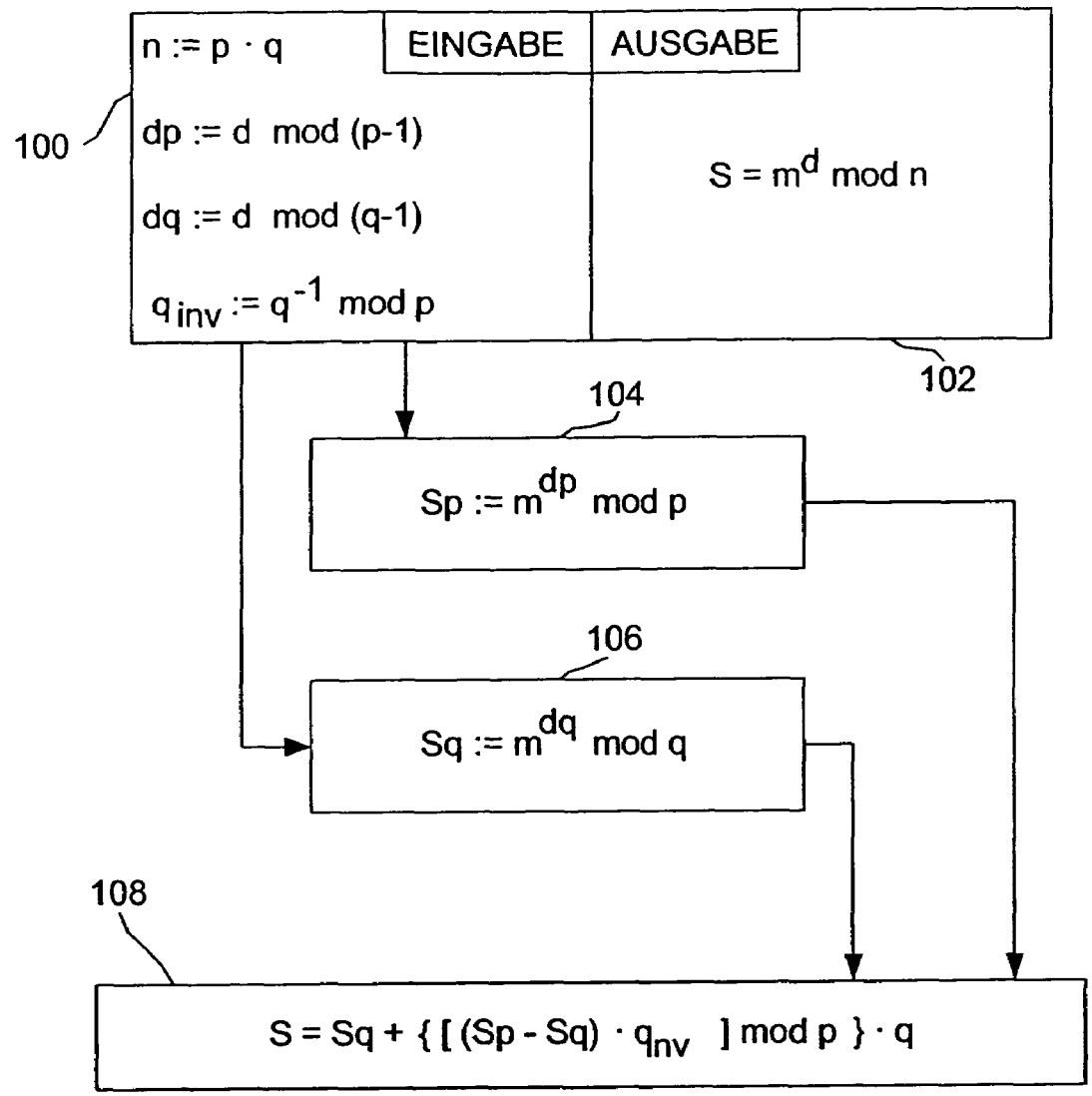
FIG. 3 shows a block diagram of the RSA-CRT method using the Garner algorithm.

This verification algorithm may be applied directly to the combining step in block 108 of FIG. 3. To this end, the following procedure is adopted. Initially, use is made of the intermediate result s yielded by block 108 which is preferably present in an output register of the cryptoprocessor. In addition, an input data memory location, at which the first prime number p is stored, is accessed. Subsequently s mod p is calculated, and the result obtained is buffered. Then an intermediate result memory location, at which the result of block 104 is stored as sp, is accessed. The result of the calculation s mod p is compared with the sp stored. If it turns out that the equality condition has been met, the first part of the verification algorithm has not led to an error. The analogous procedure may be adopted for the second prime number q to calculate s mod q and to then compare this result with sq. If the equality condition is yielded here as well it can be assumed that the combining step has been performed correctly and that a change that would indicate a hardware attack has taken place neither at the input data memory location, where p and q are stored, nor at the intermediate result memory location, where sp and sq are stored. If, however, at least part of the verification algorithm yields an error, the output is suppressed, since changes have occurred in the act of combining itself and/or at the memory locations for sp, sq, p, q.

The first part of the verification algorithm s mod p=sp will be explained in more detail below. It is evident from the equation represented in block 108 that same "degenerates" to yield s=sq+(sp−sq) after a modular reduction with the first prime number p, so that the expressions +sq and −sq cancel each other out so that sp remains.

If, however, s mod q=sq is used in the second part of the verification algorithm, a closer look at the equation in block 108 reveals that same forms the sum of sq and an integer factor multiplied by q, wherein the modular reduction, by means of the module q, of q times a constant number yields the value 0, so that of the equation in block 108, sq remains.

From a closer analysis of the equation for s in block 108, further verification algorithms may be derived, using the above explanations, to process the result of the combination in some manner so as to obtain a predetermined result if no error has occurred or, respectively, to obtain a result deviating from the predetermined result if an error has occurred during combining.

A preferred embodiment of the present invention will be described below with reference to FIG. 2, wherein the combining step is marked as block 64, whereas the first part of the verification algorithm is represented in block 66a and the second block of the verification algorithm is represented in block 66b. For further protection from error attacks, the entire RSA-CRT method shown in FIG. 2 uses an error verification by means of the input data as well as by means of the first and second auxiliary quantities so as to double-check the correct calculation of these quantities.

Figure 2:
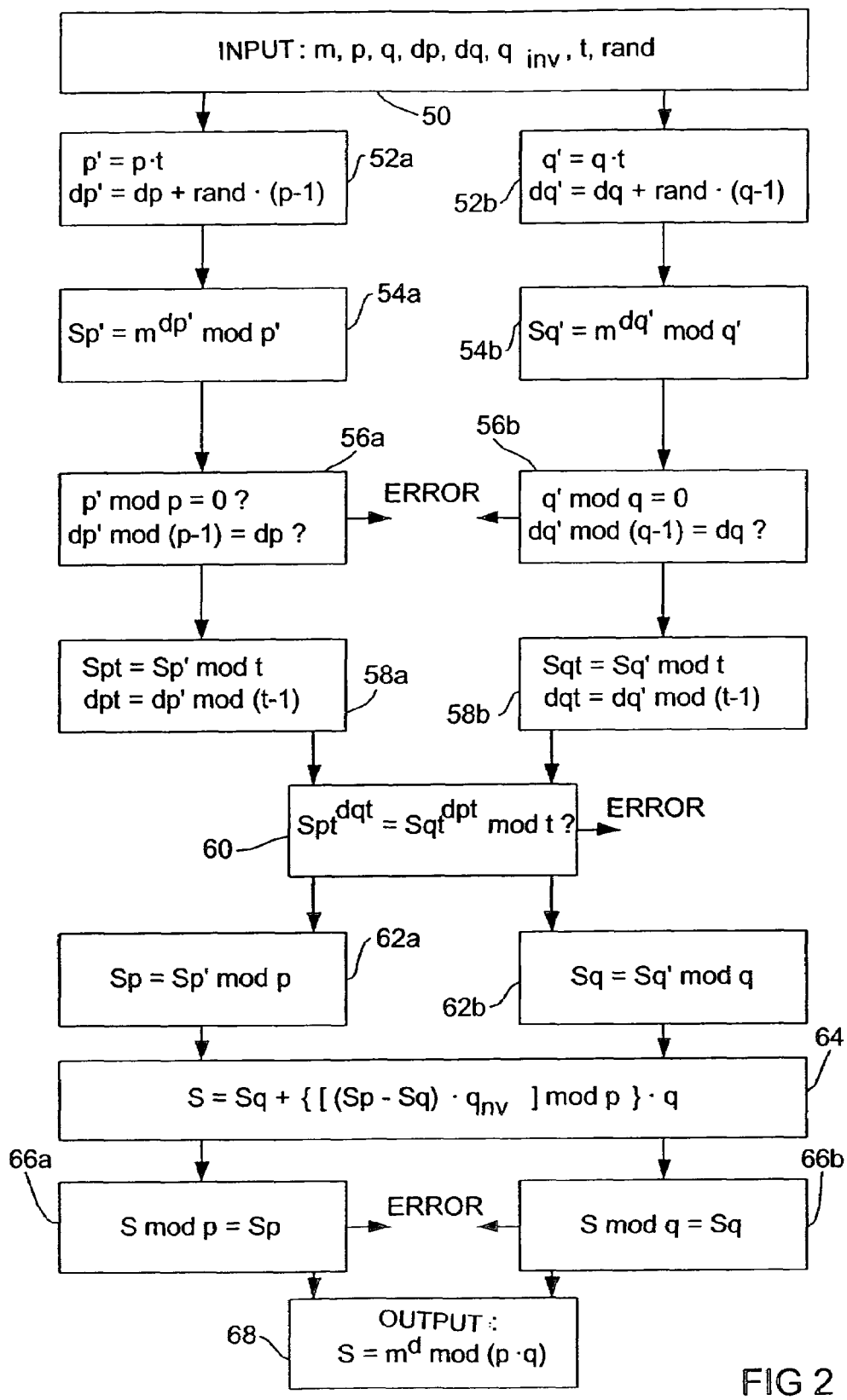
FIG. 2 shows a preferred embodiment of a secure RSA-CRT method, wherein in addition to the verification of the combining step, a verification of a change in input data and a verification of intermediate results are also performed.

For safely executing the RSA-CRT method, the preferred embodiment shown in FIG. 2 additionally uses a verification of the input data at several locations within the algorithm prior to outputting output data of a cryptographic algorithm.

In addition, the calculation of the cryptographic algorithm itself, in particular the calculation of the two auxiliary exponentiations, is also verified in the embodiment shown in FIG. 2.

As was already represented by means of FIG. 3, the parameters p, q, dp, dq, qinv, which are the usual input parameters for the RSA-CRT method, are initially provided. As is represented in a block 50 of FIG. 2, the message m to be encrypted as well as a number t and a random number rand are further provided as input data. The number t is preferably a prime number, and preferably a small prime number which is, for example, no longer than 16 bits, so as not to impair the advantage of the CRT method too much, namely that the two auxiliary exponentiations are performed with a smaller module as compared to a single modular exponentiation with the module n=p times q. If the number t is no prime number, this case is also possible, however the expression (t-1) would have to be replaced by the Euler Phi function of t in the equations.

Initially, input data is processed in blocks 52a, 52b. The multiplication of the original parameters p and/or q with the prime number t is used as the processing algorithm. Further, the addition of dp with the product of the random number rand and the number (p-1), and accordingly for q, is used as the processing specification.

It shall be pointed out that a single one of the four processing specifications given in blocks 52a, 52b would, in principle, lead to an inventive effect. After blocks 52a, 52b have been completed, the security information p', dp', q' and dq' obtained by the processing are stored at a security information memory location. This memory location could be, for example, the working memory of a crypto-processor, or an internal register associated with the calculating unit of the crypto-processor. Subsequently, as is represented by blocks 54a, 54b, both the first auxiliary exponentiation (sp') and the second auxiliary exponentiation (sq') are carried out, by the calculating unit, as the calculation within the cryptographic algorithm, as is shown in FIG. 2. After performing blocks 54a, 54b, the output data of the calculations, namely sp' and sq', are not either directly output and/or directly forwarded for a further calculation, but a verification is carried out in accordance with the invention, initially in blocks 56a, 56b by means of a check algorithm, as to whether the input data for the calculation in blocks 54a, 54b have been changed by blocks 54a, 54b during the calculation. To this end, a modular reduction is used as the check algorithm, wherein either 0 is expected as the predetermined result, as is represented in the first lines of both blocks 56a, 56b, or either dp or dq is expected as the predetermined result. The predetermined result comes about if the variable p', which in the terminology of the present invention is the security information, has not been changed, for example due to an error attack. The same applies to the further security information dp'.

If the verifications in blocks 56a, 56b are successful, i.e. if predetermined results are obtained by means of the check algorithm, the process proceeds to blocks 58a, 58b. Blocks 58a, 58b show preferred pre-calculations so as to perform, in addition to the input data verification concept, a result data verification concept. By means of a result check algorithm (block 60 in FIG. 2), a verification is then performed as to whether the calculation of the auxiliary exponentiations in blocks 54a, 54b has been performed correctly.

In blocks 62a, 62b the auxiliary exponentiations of blocks 54a, 54b are subjected to a corresponding modular reduction to eliminate the influence of the parameter t and/or of the random number. As has been clarified by means of block 108 of FIG. 3, the joining step is finally carried out in a block 64 so as to produce the signed message s from the auxiliary exponentiation results sp, sq.

In a preferred embodiment of the present invention, however, this result is not directly used, but a verification as to whether the joining has been successful is carried out after the joining in block 64.

This is achieved by initially subjecting the obtained signed message s to a modular reduction using the prime number p as the module. This check algorithm should yield sp as a result, this sp having to be equal to the value sp calculated in block 62a.

An analogous approach is adopted in a block 66b so as to verify the correctness of the result s also by means of a modular reduction with the prime number q as the module. To this end, the intermediate memory location at which the result of block 64 was stored is initially accessed for executing the calculation given in block 66a. In addition, the memory location at which the input data p is stored is accessed. Finally, the memory location at which the result of block 62a, i.e. sp, is stored, is accessed so as to perform a comparison of block 66a. An analogous procedure is adopted in block 66b for s, q and sq.

If the calculation in block 66a provides a predetermined result to the effect that the left and right sides of the equation given in block 66a are not the same, an error is output, and the output of the result s of block 64 is suppressed. The same suppression of the result s takes place if the calculation in block 66b yields that an error has occurred. Thus, a suppression preferably takes place already if a single block has yielded an error, or, in other words, a result is output by means of a block 68 only if both the calculation in block 66a and the calculation in block 66b were correct.

It becomes evident in the example in block 66a that this result check algorithm is advantageous in that it directly uses the result of block 64 for verification, that it also accesses, however, the input data memory area to obtain the prime number p and/or the contents of the memory location at which p should be located, and that additionally an intermediate result, i.e. sp, is used which has been obtained in step 62a. Thus a verification is performed, by means of a calculation, as to whether any input data has changed, and a verification is performed as to whether the joining step 64 of the RSA-CRT method has been carried out correctly by the crypto-computational unit. Finally, an intermediate result sp is also used so that intermediate result registers are also included in a single simple calculation.

It becomes evident from the embodiment shown in FIG. 2 that both the processing algorithm for creating the security information and the check algorithm for verifying the input data are simple algorithms which are anyhow present in a crypto-computational unit, such as a multiplication algorithm or an algorithm for performing a modular reduction. The same applies to the processing algorithms in blocks 62a, 62b which are also based on a modular reduction, and to the check algorithm in blocks 66a, 66b which in turn is based on a modular reduction.

Even though in the preceding embodiment shown in FIG. 2 the multiplication of a number with a constant has been represented as the processing algorithm, and the modular reduction of the multiplication result with the original number has been represented as the check algorithm corresponding to this processing algorithm, it is evident for those skilled in the art that a number of processing algorithms and check algorithms corresponding to one other exist which make it possible to verify whether input data was changed, for example due to error attacks, during the performance of a calculation in a cryptographic algorithm.

In addition, it becomes evident from FIG. 2 that the processing algorithms, just like the check algorithms, may be implemented in a very simple manner and do not require any additional parameters other than the parameters that are present anyhow. In particular, it is preferred, in accordance with the invention, not to calculate any additional parameters, such as, for example, the public key e, in an expensive manner and then use it for a "counter-calculation" but to link as many input data, intermediate result data etc. as possible with each other, since in doing so potential errors in the working memory, in the internal registers or in the computational unit itself may be detected by means of a single verification step so as to suppress a data output in the event of an error so that no secret information may be determined from an incorrect output.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A method for protecting an exponentiation calculation by means of the Chinese remainder theorem using two prime numbers forming auxiliary modules for calculating auxiliary quantities which may be joined to calculate a modular exponentiation for a module equal to the product of the auxiliary quantities, wherein the exponentiation calculation is performed within a cryptographic algorithm for an encryption of a message, a decryption of a message, a signature generation from a message or a signature verification calculation from a message, the method comprising:

calculating the first auxiliary quantity using the first prime number as the module and using the message;

calculating the second auxiliary quantity using the second prime number as the module and using the message;

combining the first auxiliary quantity and the second auxiliary quantity using a combination algorithm to obtain a result of the exponentiation calculation;

following the combining step, verifying the result of the exponentiation calculation by means of a verifying algorithm, which differs from the combination algorithm, using the first prime number and/or the second prime number, the verifying algorithm providing a predetermined result if the combining step has been performed correctly; and if the verifying step shows that the verifying algorithm provides a result other than the predetermined result, suppressing an output of the result of the exponentiation calculation.

2. The method as claimed in claim 1, wherein in addition to the result of the exponentiation calculation, the verifying algorithm uses as input data contents of a memory location at which the first auxiliary quantity, the second auxiliary quantity, the first prime number or the second prime number are stored.

3. The method as claimed in claim 1,
wherein the exponentiation calculation is an RSA encryption, an RSA decryption, an RSA signature calculation or an RSA signature verification calculation.

4. The method as claimed in claim 1,
wherein the combination algorithm is the Garner algorithm.

5. The method as claimed in claim 1,
wherein the verifying algorithm includes a modular reduction of the result of the exponentiation calculation with the first prime number and/or the second prime number as the module.

6. The method as claimed in claim 1,
wherein the first auxiliary quantity is calculated as follows:

$$sp:=m^{dp} \bmod p;$$

wherein the second auxiliary quantity is calculated as follows:

$$sq:=m^{dq} \bmod q;$$

wherein the combination algorithm is defined as follows:

$$s=sq+\{[(sp-sq) \cdot q\mathrm{inv}] \bmod p\} \cdot q;\text{ and}$$

wherein the verification algorithm is defined as follows:

$$s \bmod p=sp;\text{ and/or}$$

$$s \bmod q=sq;\text{ and}$$

wherein the predetermined result is an equality condition in the verification algorithm.

7. The method as claimed in claim 1, further comprising:
after the step of combining the first auxiliary quantity and the second auxiliary quantity, verifying whether any input data for the exponentiation calculation have been changed, and, if this is so, suppressing the result of the exponentiation calculation.

8. The method as claimed in claim 7, wherein a random number is used for verifying auxiliary exponents.

9. The method as claimed in claim 7, wherein a prime number is used as input data for verifying the first prime number and the second prime number.

10. The method as claimed in claim 9, wherein the prime number has a number of digits which is smaller than the number of digits of the first prime number and of the second prime number.

* * * * *